United States Patent [19]
Nolting et al.

[11] Patent Number: 6,094,516
[45] Date of Patent: Jul. 25, 2000

[54] DIGITAL OPTICAL SWITCH

[76] Inventors: Hans-Peter Nolting, Ringslebenstrasse 68, D-12353 Berlin; Gravert Martin, Herderstrasse 13, D-10625 Berlin, both of Germany

[21] Appl. No.: 08/930,458

[22] PCT Filed: Mar. 4, 1996

[86] PCT No.: PCT/DE96/00634

§ 371 Date: Oct. 2, 1997

§ 102(e) Date: Oct. 2, 1997

[87] PCT Pub. No.: WO96/31800

PCT Pub. Date: Oct. 10, 1996

[30]     Foreign Application Priority Data

Apr. 3, 1995 [DE] Germany .............................. 195 13 319

[51] Int. Cl.[7] ...................................................... G02B 6/26
[52] U.S. Cl. ................................. 385/40; 385/39; 385/45
[58] Field of Search .......................................... 385/40–45

[56]    References Cited

U.S. PATENT DOCUMENTS

| | | | |
|---|---|---|---|
| 4,966,431 | 10/1990 | Heismann | 385/40 |
| 5,076,655 | 12/1991 | Bridges | 385/3 |
| 5,202,941 | 4/1993 | Granestrand | 385/41 |
| 5,418,871 | 5/1995 | Revelli, Jr. et al. | 385/44 |
| 5,455,876 | 10/1995 | Hopfer et al. | 385/2 |

*Primary Examiner*—Rodney Bovernick
*Assistant Examiner*—Ellen E. Kim

[57]              ABSTRACT

Digital optical switches (1) with asymmetrical wave guides (2, 3; 5, 6) and an electro-optically controllable adiabatic coupling in a central region (4) must have a degree of crosstalk suppression of better than 20 dB for use in transparent optical networks. With X or Y arrangements, the invention provides for this purpose a grid device (10) in the central region (4) which affects the wave guide's inherent modes as the main cause of the crosstalk, i.e. amplitude and phase matching of the wave guide's inherent modes at the output. The result of the solution of the invention takes the form of a "cascade" of two different physical effects, each of which, of at least 20 dB, contributes to the overall result crosstalk suppression of better than 40 dB.

10 Claims, 4 Drawing Sheets

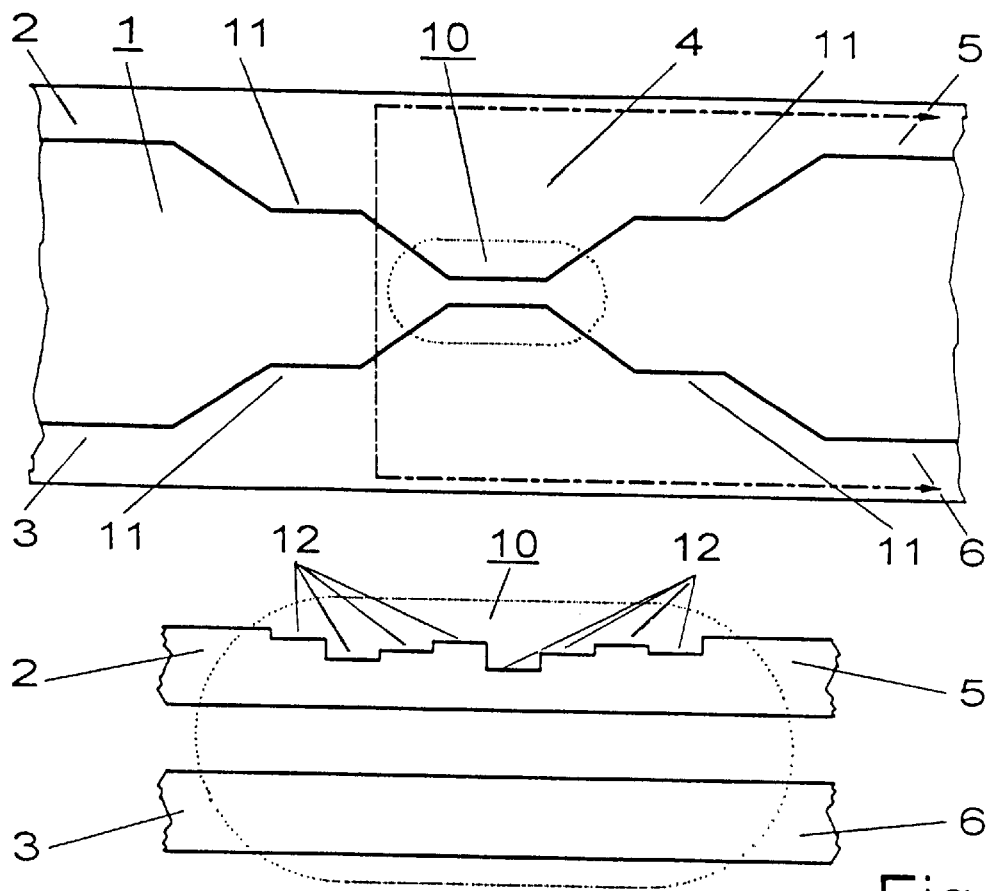
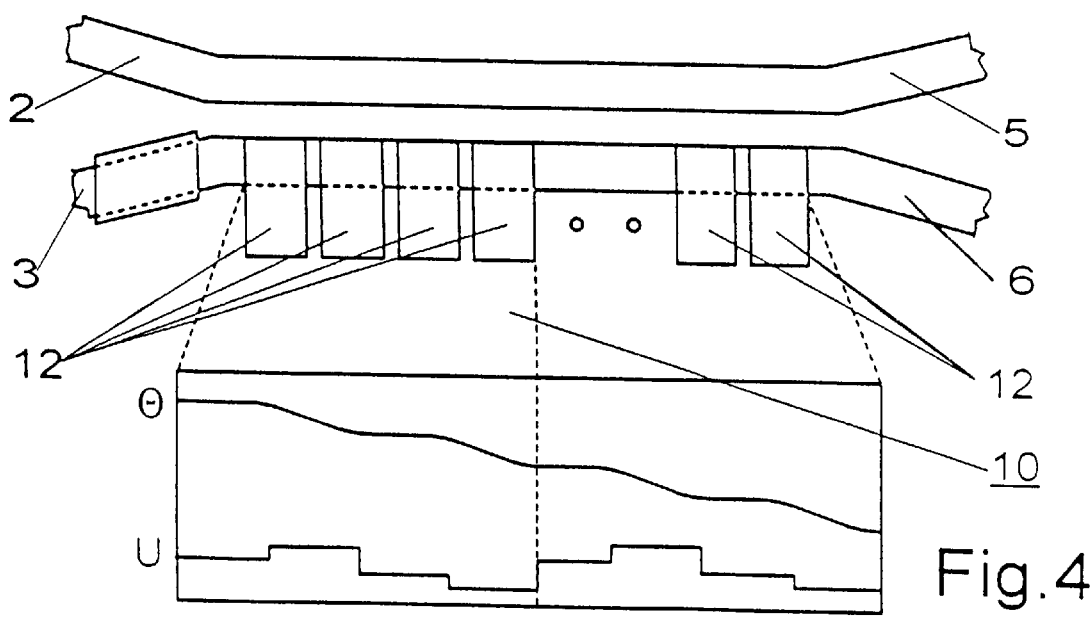

DIGITAL OPTICAL SWITCH

BACKGROUND OF THE INVENTION

1. Field of the Invention

The invention relates to a digital optical switch, in which two asymmmetric waveguides are arranged to run at least closely adjacent over a short path length, and are constructed to be electro-optically controllable in a central region with respect to their adiabatic coupling and also are provided in the central region with a grid arrangement which affects the waveguide eigenmodes.

Digital optical switches—termed "DOS" for short hereinbelow—are required particularly in transparent optical nets. They—as well as other components—should make through optical transmission paths possible, in which optical fibers, as a transmission medium in the wavelength region of about 1.3–1.6 μm, are to provide a transmission bandwidth totaling about 50 THz and usable simultaneously for several channels. The optical switches, to be used for example in multiplexers/demultiplexers and also to be grouped together to form switch matrices in switching or distribution centers, are to be substantially independent of polarization and wavelength, and are to have a short overall length as integrable components and moreover low losses and the lowest possible crosstalk.

2. Discussion of Relevant Art

A digital optical switch of the kind stated at the beginning is known from WO 93/17363, to the extent that there, the central region is formed by a bimodal waveguide, which effects mode conversion, and which has for this purpose periodic cross section changes and a single electrode, and furthermore can be provided with asymmetric Y-branches on the output side and/or input side (cf. in the citation, FIG. 1 an also Specification page 13, lines 4–12). The function of this known optical switch is based on permitting, or not permitting, a conversion of the null and first order modes to take place. In this manner, in/out switches or direction couplers can be embodied.

Another kind of digital optical switch is known from "Applied Physics Letters" 51(16), October 1987, pages 1230–1232. According to this, the asymmetric waveguides which cross each other in a four-gate digital optical switch can be constructed with a different width between the input and the crossing region and with the same width between the crossing region and the output, but made opto-electronically controllable with respect to their refractive index. So that the adiabatic coupling is not interrupted, the electrodes serving for electro-optic control can be shaped so that the changes are gradual in the electrical fields which are acting.

The function of a DOS in X-structure, which is based on the principle of adiabatic asymmetric Y-branching, thus consists in that the light waves which are conducted into the input region of a light waveguide reach, in the central region, only that waveguide branch in which the same conditions prevail for the propagation of this light wave. If then the propagation properties of the waveguide branches leading to the outputs are thus respectively set to the propagation properties of the one or of the other input waveguide branch, the light waves fed into the X-DOS can—even simultaneously—be directed to one or other output. It furthermore has excellent properties as regards polarization and wavelength independence, but however does not fulfill, as it stands, the particularly high requirements regarding the crosstalk permissible in transparent optical nets. A crosstalk damping of 20 dB, under favorable circumstances 30 dB, is not sufficient when an optical signal has to run through for example 100 cascaded stages. For this, 40 dB per stage is required, and indeed in the circumstances arising in the least favorable case.

The following is to be taken into account for other methods, e.g., "total internal reflection" (TIR) and "two mode interference" (TMI), with which the crosstalk damping of a DOS could be improved:

In both these methods, the desired polarization and wavelength independence are in any case not already provided. According to the TIR method, the preconditions of short overall length and particularly of low crosstalk are indeed fulfilled, but comparatively high losses have to be considered, if indeed a material were available at all which makes possible the refractive index difference $\Delta n_{EO}$ of about 0.3 which is required in these methods. The TMI method, in contrast to this, can be embodied with available materials, and low losses can also be expected, but it requires a large overall length and a precise power distribution which is dependent on close tolerances which have to be maintained in the manufacturing process.

Surprisingly, another kind of starting point offers a solution for the technical problem on which the invention is based. In [German Patent] DE 44 04 777 A1 of Feb. 10, 1994, a control element for acting on light beams in optical waveguides is disclosed, concerning which a report was already given on the occasion of the conference "Integrated Photonics Research 1994", Feb. 17–19, 1994, in San Francisco, Calif. (U.S.A.) (see H.-P. Nolting, M. Gravert: "Theoretical Investigation of a Tunable, Narrowband, Electro-Optical Filter with Low Crosstalk and a Large Number of Optical Channels", Technical Digest Series, Vol. 3 (Optical Society of America, Washington, DC, 1994), pages 290–292, respectively FB 3-1 to FB 3-3). This control element provides for individual patterns, which respectively are associated with a given wavelength within a spectral region. The control element can thus be set to given operating conditions and can carry out a mode conversion, e.g. for light rays of a given wavelength.

SUMMARY OF THE INVENTION

The solution according to the intention now proposes, in a digital switch of the kind mentioned at the beginning, to construct the waveguides, the electrodes serving for their electro-optically controllable adiabatic coupling, and the grid arrangement which affects the waveguide inherent modes, as substantially vertical layers on a substrate. This grid arrangement is installed as an additional structure between the asymmetric waveguides and serves simply and solely for the adjustment of the amplitude and phase of the waveguide eigenmodes.

The solution according to the invention is based on the following considerations and knowledge:

For waveguide eigenmodes, there holds in general:

$$\begin{pmatrix} E_+ \\ E_- \end{pmatrix} = \begin{pmatrix} \cos\Theta \\ \sin\Theta - e^{j\phi} \end{pmatrix}, \tan\Theta = \left| \frac{E_+}{E_-} \right|$$

where the symbols denote:

E+, E−: Amplitude measure of the two waveguide eigenmodes

Θ: Amplitude ratio

φ: Phase angle $j = \sqrt{-1}$

A four-gate DOS can be considered as a structure assembled from two Y-branches, and has respectively two single-mode inputs and outputs and a common two-mode junction.

For a light wave fed into one input, a linear combination of the two modes is obtained in the region of the two-mode junction, and is described by the amplitude ratio Θ, with the phase angle $\phi_{in}$.

For an output at which no light wave is to appear, there always exists, according to the reciprocity law of a passive optical component, a linear combination of $\Theta_{out,o}$ with $\phi_{out,o}$, for which the crosstalk $P_{crosstalk}$ is zero, $$P_{crosstalk}=f(\Theta_{out,o}, \phi_{out,o})=0$$

From this it follows for the invention, that in the region of the two-mode junction, an adjustment must be brought about according to:

$$\Theta_{in}=\Theta_{out,o} \text{ and } \phi_{in}=\phi_{out,o}.$$

This adjustment can be attained by means of an electro-optic mode transformer.

The causes responsible for the undesired crosstalk indeed cannot be eliminated in this manner; however, they can be effectively influenced as they are evident in their results. The main causes of crosstalk reside, for example, in curvatures and cross section changes of the waveguide, in sudden changes of its refractive index, in electrodes acting on the waveguide, and the like, which effect a conversion between the first and the second waveguide eigenmodes in the central region of a two-mode DOS. The grid arrangement according to the invention adjusts the amplitude and phase of the waveguide eigenmodes—in addition to the normal adiabatic coupling of the light waves conducted in the waveguide—respectively to the output of the Y-branch. Furthermore, in comparison with a DOS without the grid arrangement compensating the waveguide eigenmodes, a rise of the signal amplitude can be established which is due to an energy transfer taking place from one mode to the other. Thus the result of the solution according to the invention represents a "cascading" of two different physical effects, each of which contributes at least 20 dB to the overall result of a crosstalk damping of 40 dB and better.

With reference to the previous, already mentioned state of the art with lateral structures, the grid arrangement which affects the waveguide eigenmodes can be designed, in preferred embodiments of the invention, as an electro-optical, optionally controllable electrode structure. All of these embodiments are of like construction in cross section, and can either be individually, fixedly set to different nominal values of an operating parameter, or can even be adjusted later, for changing nominal values. Large production tolerances can be permitted, and can be compensated for by the programing of the wig pattern of the electrodes.

Such an embodiment of the electrode structure has four electrode strips per period and includes at least one period. The four electrode strips have a width of smaller than $\lambda/4$, in order to be able to freely set the phases. However, two electrode strips with a width of smaller than $\lambda/2$ could also be provided; they are operated at voltages which are twice as high in contrast to the abovementioned four-electrode configuration.

Since the mode converter is used as a correction element and hence only small amplitude changes of a few percent are required, only a few (1 ... 2) periods are required, in contrast to filter arrangements. A component with such a correction element is thus also of a wide-band nature.

The embodiments according to the invention make it possible to shorten the overall length which is essentially required for the adiabatic coupling, and to facilitate integrability. The two waveguides can be constructed for 1.3 $\mu$m from quaternary materials with a $\Delta n_{EO}$ of 0.03, on the basis of InP material. The overall length of such an X-DOS is then under 1,000 $\mu$m, so that wafers with 2 inch=50.8 mm diameter can receive, for example, a 32×32 switching matrix.

In this technology with substantially vertical layers on a substrate, a grid arrangement which has effects on the waveguide eigenmodes can be embodied in a simple manner, and can be constructed as a fixed predetermined digital surface structure of that waveguide which is located above the other waveguide. Such an embodiment of the invention, which otherwise corresponds in its overall length to an electro-optically controllable electrode structure, also has comparable advantages as regards bandwidth and thus its possibilities of use.

Its own inventive importance is likewise to be attributed to a further variant of the digital optical switch according to the invention and to its preferred embodiments. In this variant, the waveguides outside the path length in which the grid arrangement acting on the waveguide eigenmodes is located have at least one section, acting as a phase shifter, with a length of $\lambda/4$. The phase displacement which is thus brought about—purely passively—leads to a backward coupling instead of the forward coupling which otherwise takes place, and thus makes it possible to considerably reduce the overall length.

In a further application of the invention with its own inventive importance, the central region in a Y-structure consisting of three waveguide branches is connected via a mode taper to a passive waveguide which forms the single waveguide branch.

Switching matrices for distribution systems can be built from such switches. The physical principle of mode adjustment for the reduction of crosstalk is analogous to the X-DOS. The relative amplitudes and the phases of the first and second modes must be adjusted, from the beginning of the central region up to the ends of the two other waveguide branches of the Y-structure at the interface between the end of the central region and the beginning of the said two waveguide branches, so that the crosstalk is smaller than the predetermined limits, e.g., −40 dB.

It is particularly advantageous in the abovementioned application if the two waveguides which form the other waveguide branches of the Y-structure are provided with passive sections at the ends forming the outputs, these sections being identical in their light-conducting properties with those of the passive single waveguide which forms the input. In this manner, the potential for cascading of Y-DOS components into large matrices, particularly in integrated construction, is facilitated in a simple way.

Furthermore, in this application, provision is made for making the mode taper symmetrical, with regard to a high flexibility for compensating deviations. It then produces only the first mode; the switching states of the electro-optical grid arrangement are then to be reconfigured corresponding to the respective data. For this purpose, either the voltage values of the individual electrodes in the central region can be determined, or the sides of the electrodes can be interchanged, since the phase differences are different by $\pi$.

In all of these embodiments it is desirable to arrange a splitting taper between the mode taper and the central region. Such splitting tapers reduce the optical losses for the light waves which undergo mode conversion and adiabatic coupling.

BRIEF DESCRIPTION OF THE DRAWINGS

The drawings schematically reproduce the structural constructions which are of inventive importance for the embodiment of digital optical switches of the kind according to the invention, and also reproduce in a diagram the extent of reduction of crosstalk.

FIG. 3 shows an X-DOS, similar to those of FIG. 1 or 2, with waveguides which are guided close together along a short path length, and which, outside this path length, have sections of length $\lambda/4$ which act as phase splitters;

FIG. 4 shows the structure of a grid arrangement for affecting the waveguide eigenmodes, and a function graph for the course of the amplitude ratio $\Theta$ in dependence on the switching pattern of electrode strips;

DETAILED DESCRIPTION OF PREFERRED EMBODIMENTS

Figure 1:
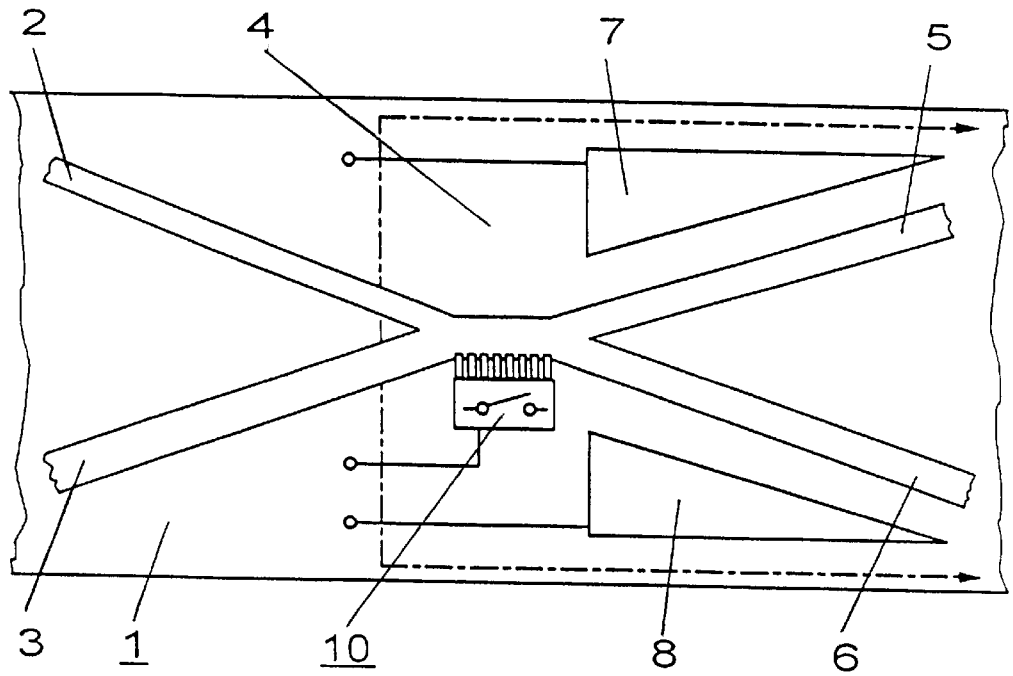
FIG. 1 shows an X-DOS with asymmetric, crossing waveguides and a grid arrangement in the crossing region to affect the waveguide eigenmodes.

The digital optical switch 1 shown in FIG. 1 ("DOS") is built up from asymmetric waveguides 2, 3, 5, 6. The asymmetry arises here both from between the waveguides 2 and 3 and also first of all between the waveguides 2 and 5 or 2 and 6 and the waveguides 3 and 5 or 3 and 6, in that, for example, the cross sections of the waveguide 2 and 3 are different from each other, and also differ from the identical cross sections of the waveguides 5 and 6. The propagation properties of the waveguides can be affected by means of electrodes 7 and 8, in that their refractive index n is electro-optically increased to $n+\Delta n_{EO}$ or reduced to $n-\Delta n_{EO}$. In this manner, a light wave fed into the waveguide 2 can arrive either in the waveguide 5 or the waveguide 6, and simultaneously another light wave, fed into the waveguide 3, can arrive in the waveguide 6 or 5.

The function of such a DOS is based on the principle of adiabatic coupling in a central region 4 and is known per se. The crosstalk is about –20 dB in so far as known photonic components are used, or in favorable cases –30 dB, and is not sufficient if several DOS are to be cascaded, e.g. in switching matrices.

The invention consists of providing such a DOS 1 with a grid arrangement 10, with which the waveguide eigenmodes are affected, in its central region 4 (here and in what follows, by way of example, always seen in the direction of propagation of the light waves, at the input region of the central region 4). The effects on the eigenmodes consist in that the amplitude and phase of the waveguide eigenmodes are adjusted to each other such that their amplitude ratio and phase ratio at the outputs of the DOS 1 is respectively 1. The grid arrangement 10 and the waveguides 5 and 6 thus represent a mode transformer, which drastically reduces the crosstalk, whose main cause lies in the conversion between the two eigenmodes. The reduction of crosstalk by at least –20 dB brought about in this manner is superposed as an independent physical effect on the crosstalk of about –20 dB in the adiabatic coupling, so that overall a crosstalk of better than –40 dB is attained in digital optical switches according to the invention and their embodiments.

The grid arrangement 10 is indicated in FIG. 1 as an electro-optical, optionally directable electrode structure and will be described in more detail in connection with the explanation of FIG. 4. However, it should be indicated here that the grid structure 10 must have respectively 4 electrode strips per period, and in general requires one period or two periods. Thus there results for the grid arrangement 10, from the constructional point of view, an overall length of e.g. only $2\times4\times\lambda/4=2\lambda$, and from the functional point of view, outstanding wide band characteristics.

Figure 2:
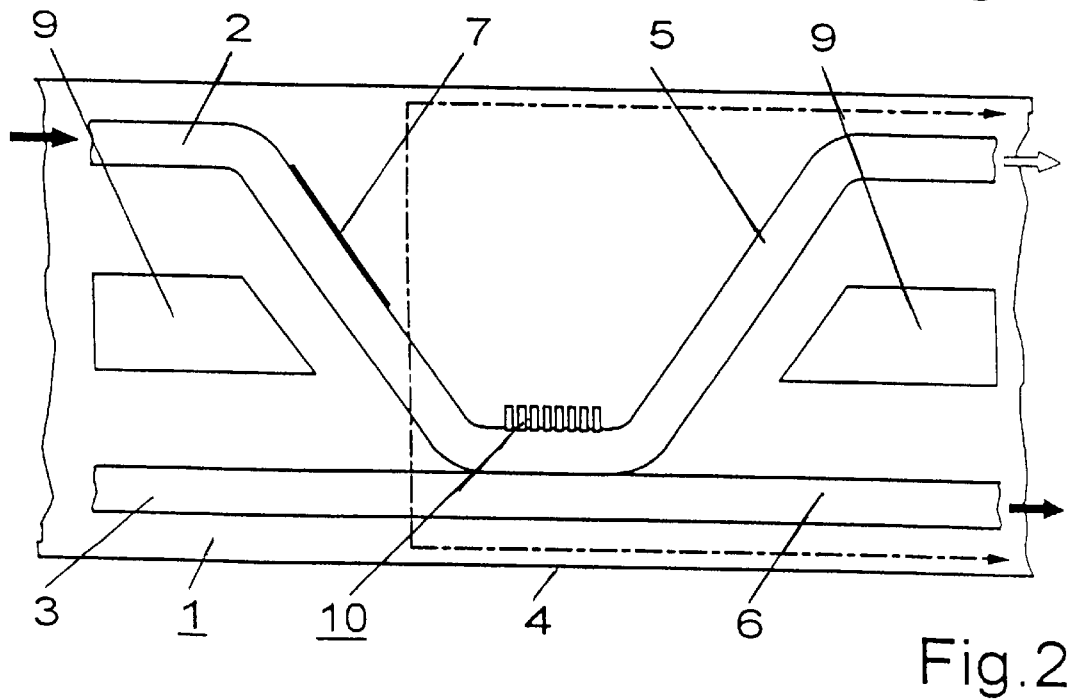
FIG. 2 shows an X-DOS, similar to that of FIG. 1, but with substantially vertical layers on a substrate, and with waveguides which mutually come into contact over a short length of path.

The DOS 1 shown in FIG. 2 is constructed as a single photonic component with substantially vertical layers formed on a substrate. Such a construction presents advantages both in production, in comparison with the construction of lateral structures, and also as regards shorter overall lengths for many partial regions of such components. Moreover a few special features are shown in FIGS. 2 and 3, and can be transferred to other embodiments of the invention if so required.

Thus a DOS 1 according to FIG. 2 can be constructed as a changeover switch. Only one of the waveguides 2 and 3 on the input side of the DOS 1 is used. The light wave introduced there goes either into the waveguide 5 or into the waveguide 6 on the output side of the DOS 1. Both waveguide paths 2/5 or 3/6 have identical and constant cross sections; they differ, however, by $\Delta n$ with regard to the refractive indices $n_1$ and $n_2$. By means of an electrode 7 which partially covers the waveguide 2 with the refractive index $n_1$, the refractive index can be electro-optically reduced there by $\Delta n_{EO}$ to a refractive index of $n_2$. The refractive index $n_1$ in the waveguide path 2/5 otherwise remains constant, i.e., the light wave introduced into the waveguide 2 emerges via the waveguide 5.

The grid arrangement 10 in the central region 4—here again merely indicated, in view of FIG. 4 and the associated explanation—can be constructed in the same process step as the electrode 7. A lossy layer 9 is provided between the waveguides 2 and 3 and also between 5 and 6, which reduces undesired side effects.

The DOS 1 shown in FIG. 3 has further special features. First of all, it is characterized in that the waveguide paths 2/5 and 3/6 neither cross nor come into contact, but must however be arranged to run closely adjacent over a short path length. Furthermore, in embodiments of the invention in which the crosstalk is independent of the two possible switching states of the DOS 1, the grid structure 10 can be constructed as a passive element, that is, as a fixed, predetermined digital surface structure. In a construction of the DOS 1 with substantially vertical layers it is advantageous to construct this surface structure on that waveguide or waveguide line which is situated above the other waveguide or waveguide line. Also such a surface structure as a grid arrangement 10 in the central region 4 of a DOS 1 has four steps per period (the steps correspond to electrode strips 12 of an electro-optical grid arrangement, as can be seen from the portion which is shown enlarged), requires few periods, in particular one or two, and is wide-band. If a narrow-band working region is desired, the number of periods, and thus the overall length, has to be increased.

Finally, FIG. 3 also shows that the waveguides 2, 3, 5, 6 respectively outside the path length in which the grid arrangement 10 is located which affects the waveguide eigenmodes can have at least one section 11 which displaces the direction of their course parallel and which respectively has a length of λ/4. Such a displacement of direction causes a phase displacement, so that a backward coupling takes place instead of a forward coupling.

FIG. 4 shows both a section of a DOS 1 with a detailed representation of an electro-optical, optionally controllable grid arrangement 10, and also in a graph, the course of the amplitude ratio ↓ of the coupled waveguide eigenmodes and a wiring pattern of the electrode strips 12 which brings about this course. The grid arrangement 10 is located in the waveguide line 5/6, e.g. at the beginning of the central region 4. Each four electrode strips 12 form a period. Only two periods are required. The digital wiring pattern of the electrode strips is made up of a total of, for example, four potential steps U. The adjustment of the waveguide eigenmodes is improved with each step.

Figure 5:
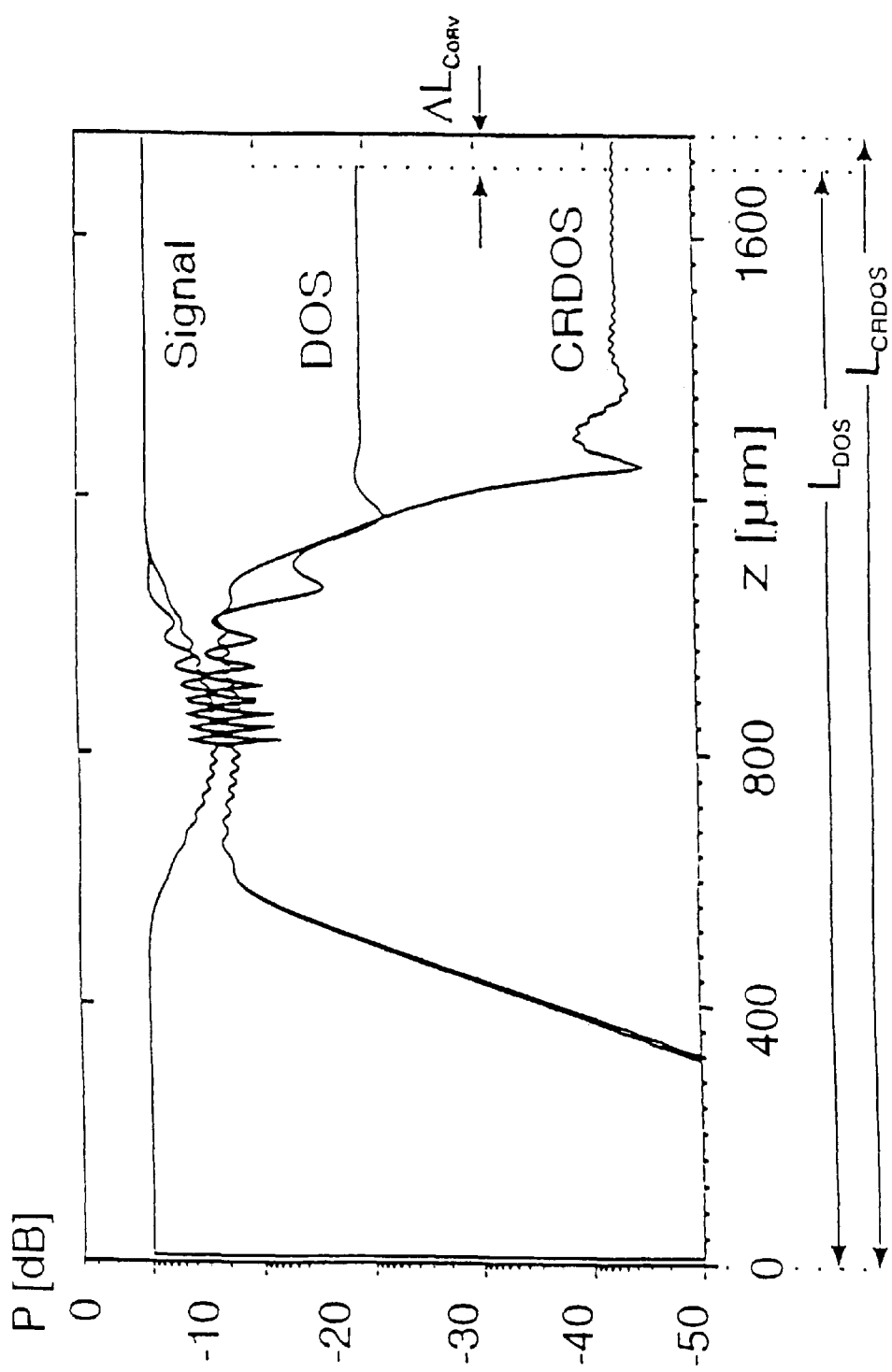
FIG. 5 shows the course of the output P (dB) of the power P (dB) of the signal and also the crosstalk over the overall length z ($\mu$m) of the digital optical switch.

The graphical course of the power P (dB) over the length z (μm) of the overall length of digital optical switches, as shown in FIG. 5, show the following: The central region 4 begins at a distance of about 800 μm from the input side. The signal has the same power at the output as at the input. In a DOS of the conventional kind, the overall length of which is 1,700 μm, the crosstalk amounts to −20 dB. A digital optical switch with reduced crosstalk (crosstalk reduced digital optical switch—CRDOS) according to the invention attains a crosstalk damping of more than 40 dB by means of the correction member which is provided as a converter for waveguide eigenmodes. With the constructional length $\Delta L_{conv}$ required for this converter, the overall length $L_{CRDOS}$ is only about 3% larger than the overall length $L_{DOS}$.

A report was given concerning digital optical switches of the kind according to the invention in X-structure (Paper # Tu A4, pages 213–216), on the occasion of the "7th European Conference on Integrated Optics" ECIO '95, Technical University Delft (NL), Apr. 3–6, 1995.

Figure 6:
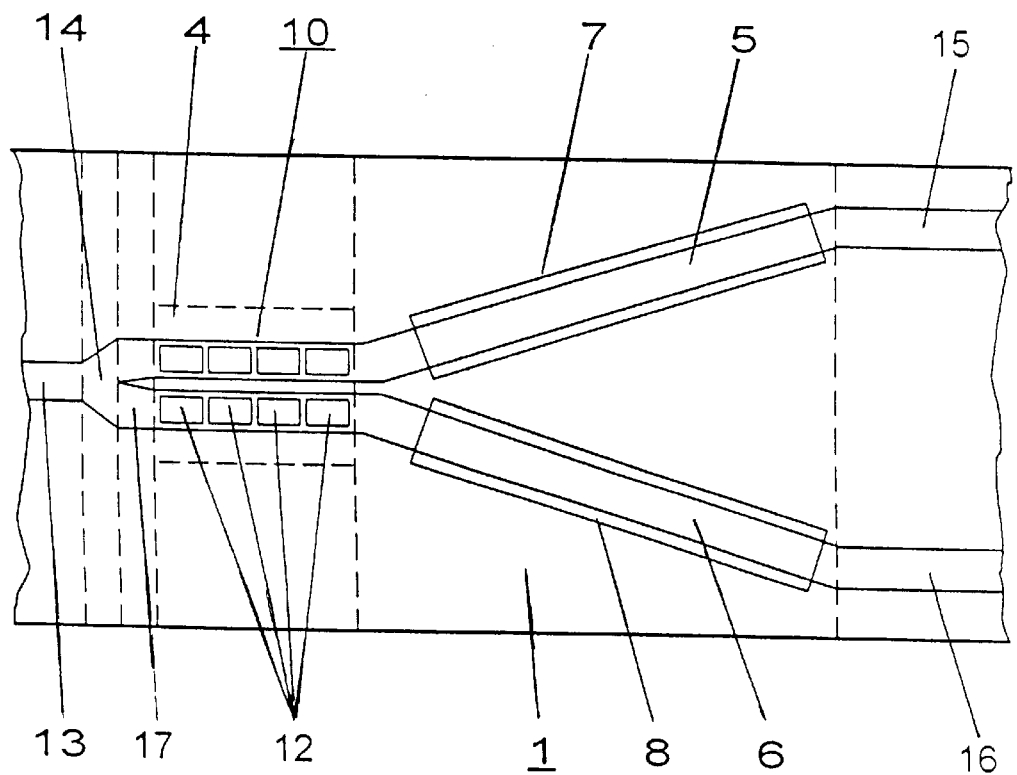
FIG. 6 shows a Y-DOS with a grid arrangement in the central region.

A digital optical switch in Y-structure is shown in FIG. 6. The waveguide branch is on the input side, and leads to the central region 4 with the grid arrangement 10, formed by a passive waveguide 13. A symmetrically formed mode taper 14 is located between the said waveguide 13 and the waveguides 5, 6 which have the electrodes 12 of the grid arrangement 10. This mode taper 14 produces the first mode. The second mode arises according to the wiring pattern of the electrodes 12. A splitting taper 17 is located between the mode taper 14 and the central region 4, for the reduction of optical losses.

The function of the digital optical switch 1 in the two branching waveguides 5, 6 is effected by means of the wiring of the electrodes 7, 8. At their ends, the two waveguides 5, 6 have passive sections 15, 16, which are identical in their light conducting properties to those of the waveguide 13. Such structures can be directly connected together in this manner, and make possible the construction of cascaded matrices, in particular in integrated circuit technology.

What is claimed is:

1. A digital optical switch, comprising:
   two asymmetric waveguides (2, 5, 3, 6) arranged to run at least closely adjacent to each other over a short path length and to be electro-optically controllable in a central region (4) of said waveguides with respect to their adiabatic coupling,
   electrodes (7) serving for electro-optically controllable adiabatic coupling of said waveguides, and
   a digital optical switch mode connection comprising a grid arrangement (10) working as a mode converter that adjusts amplitude and phase of incoming waveguides eigenmodes to amplitude and phase of outgoing waveguide eigenmodes, wherein:
   said waveguides, said electrodes, and said grid arrangement are arranged in substantially vertical layers on a substrate.

2. The digital optical switch according to claim 1, wherein said grid arrangement (10) comprises an electro-optical optionally controllable electrode structure (12).

3. The digital optical switch according to claim 2, wherein said electrode structure includes four electrode strips (12) per period and at least one period.

4. The digital optical switch according to claim 1, wherein certain of said waveguides are located above other of said waveguides, and said grid arrangement comprises a fixedly predetermined digital structure (12) on said waveguides (2, 5) that are located above other of said waveguides (3, 6).

5. The digital optical switch according to claim 1, wherein outside a length of path in which said grid arrangement (10) is located said waveguides have at least one section (11) acting as a phase shifter that parallel-offsets a course of said waveguides and has a length of λ/4.

6. The digital optical switch according to claim 1, wherein said waveguides comprise a y-structure having three waveguide branches, and said central region (4) is connected via a mode taper (14) with a passive waveguide (13) forming a single waveguide branch that adjusts amplitude and phase of waveguide eigenmodes of said single waveguide branch to amplitude and phase of waveguide eigenmodes of two other of said waveguide branches.

7. The digital optical switch according to claim 6, wherein said y-structure includes two waveguides (5, 6) that form other waveguide branches (15, 16) and are provided at their ends that form outputs with passive sections that are identical in their light conducting properties with said passive single waveguide (13) that forms an input.

8. The digital optical switch according to claim 6, wherein said mode taper (14) is symmetrical.

9. The digital optical switch according to claim 6, further comprising a splitting taper (17) arranged between said mode taper (14) and said central region (4).

10. A digital optical switch, comprising:
   two asymmetric waveguides (2, 5, 3, 6) arranged to run at least closely adjacent to each other over a short path length and to be electro-optically controllable in a central region (4) of said waveguides with respect to their adiabatic coupling,
   electrodes (7) serving for electro-optically controllable adiabatic coupling of said waveguides, and a grid arrangement (10) that affects eigenmodes of said waveguides, wherein:
   said waveguides, said electrodes, and said grid arrangement are arranged in substantially vertical layers on a substrate, and outside a length of path in which said grid arrangement (10) is located, said waveguides have at least one section (11) acting as a phase shifter that parallel-offsets a course of said waveguides and has a length of λ/4.

* * * * *